Oct. 31, 1950     R. L. MURRAY     2,527,568
APPARATUS FOR TESTING TRANSFORMER TURN RATIOS
Filed Aug. 1, 1947     3 Sheets-Sheet 1
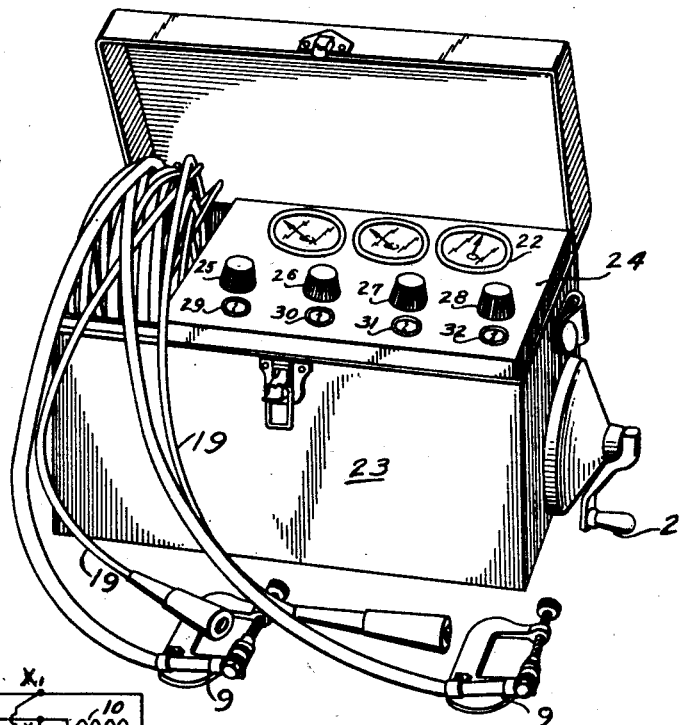
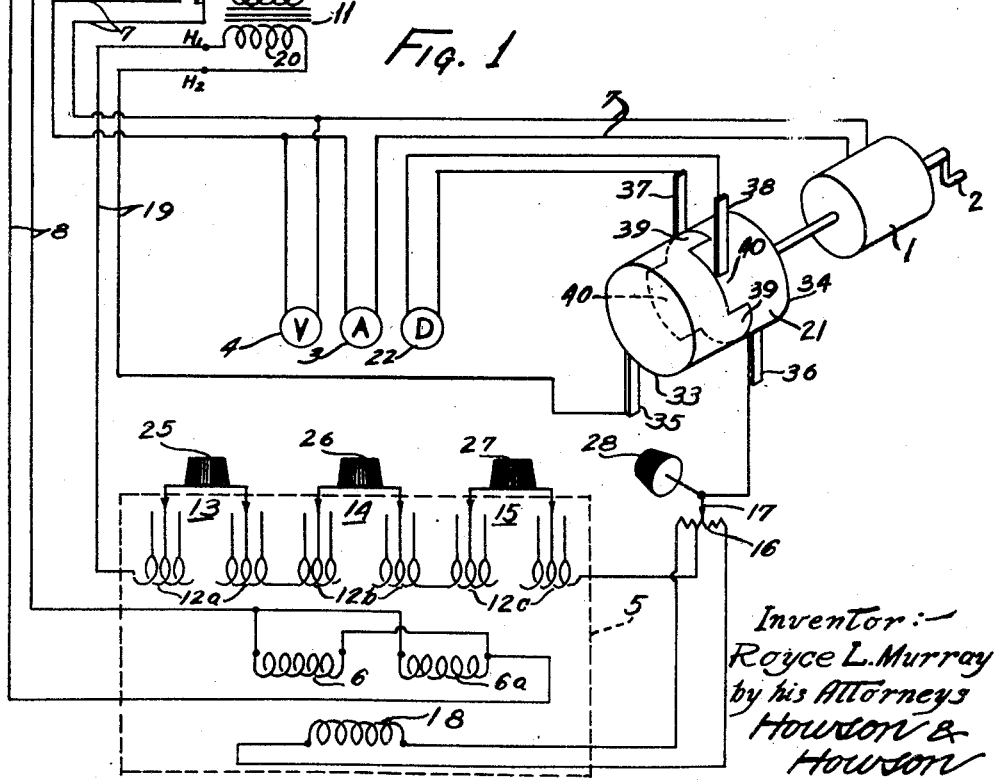
Inventor:—
Royce L. Murray
by his Attorneys
Howson &
Howson Oct. 31, 1950      R. L. MURRAY      2,527,568
APPARATUS FOR TESTING TRANSFORMER TURN RATIOS
Filed Aug. 1, 1947      3 Sheets-Sheet 2

Inventor:
Royce L. Murray
by his Attorneys
Howson & Howson

Oct. 31, 1950 — R. L. MURRAY — 2,527,568
APPARATUS FOR TESTING TRANSFORMER TURN RATIOS
Filed Aug. 1, 1947 — 3 Sheets-Sheet 3

Inventor:—
Royce L. Murray
by his Attorneys:—
Howson & Howson

Patented Oct. 31, 1950

2,527,568

UNITED STATES PATENT OFFICE 2,527,568

APPARATUS FOR TESTING TRANSFORMER TURN RATIOS

Royce L. Murray, Birmingham, Pa., assignor to James G. Biddle Co., Philadelphia, Pa., a corporation of Pennsylvania Application August 1, 1947, Serial No. 765,493

5 Claims. (Cl. 175—183)

This invention relates to measurement of ratio on electric transformers including autotransformers, and has for its principal object the provision of accurate means for direct measurement of the turn ratio between two windings, including two consecutive sections of a single winding.

The ratio of transformation is an elementary characteristic of an electric transformer. In the installation of transformers on power systems it is customary to test ratio. An object of this invention is to make such tests of turn ratio with a high degree of precision by means of a single self-sufficient equipment applicable to any ratio or size commonly occurring in power systems.

A further object is to make such tests direct-reading and independent of the regulation or impedance characteristics of the transformer under test. The time and errors of computations are correspondingly eliminated.

An important although indirect object is to provide a means for identifying sources of trouble in transformers. By means of the device of this invention, turn ratios of power transformers may be compared independently of impedance characteristics. Incorrect taps, errors in turn count, and mislabeled terminals can be detected by comparison to measured turn ratios. Shorted turns, interconnections between windings and other defects may be detected before the transformer is placed in service. Errors or failures in the connections, tap-changing gear or other auxiliaries also affect the apparent ratio. Since the invention makes it possible to determine turn ratio without computation, it is now practical to identify causes of trouble by comparing effective turn ratios to name-plate data and other known characteristics. A ratio test which imposes burden is not helpful for this purpose because the measured ratio is a function of the burden and, therefore, cannot be compared to name-plate data without reference to the very defects which it is desired to detect. Hence the measurement of turn ratio according to this invention adds a new and useful means for analyzing trouble in transformers without being in any sense a substitute for known methods of measuring voltage ratio under burden.

The device provided by the present invention is essentially of the type wherein a transformer is tested in comparison to a reference transformer of known ratio. Devices operating according to this principle are not broadly new. See for example the disclosure at page 928, volume II of the 1922 Edition of the Dictionary of Applied Physics, by Sir Richard Glazebrook. While the basic circuit here involved has been used to a limited extent, it has not been practical for a portable instrument because difficulties have been experienced, including the following.

(1) The reference transformer and associated apparatus comprise a bulky equipment unsuited to field work.

(2) Ratios must be calculated from test data since the arrangement cannot be made direct-reading over the full range of transformers used in power applications.

(3) The reference transformer can be used with only a limited range of transformers to be tested, making it necessary to have several reference transformers.

(4) The exciting voltage has been applied on the high side of the transformer requiring high potential supply, relatively large amounts of power, and safety interlocks.

(5) No provision is included for correcting phase shifts and harmonic components.

The present invention overcomes the above-mentioned difficulties and provides a portable instrument which is entirely practical and which has numerous advantages.

To avoid ambiguity in the use of terms which have varying significance among persons familiar with certain aspects of the arts to which this invention applies, certain terms used in this specification are defined as follows:

"Turn ratio" as used in this specification refers to the ratio of the actual numbers of active turns on the various windings or sections of windings and is a constant quantity descriptive of the physical arrangement of the transformer.

"Voltage ratio" refers to the ratio of terminal voltages and is a variable quantity dependent upon load or burden.

"Primary" is used to designate the winding to which voltage is applied for the purpose of testing even though such usage may be contrary to the usual function of the transformer under test (as in the case of distribution transformers).

"Secondary" identifies a winding in which voltage is induced by the influence of an associated primary.

"Auxiliary" is used to designate a special winding (in the reference transformer) which energizes the voltage divider.

"Low side" identifies the winding associated with the denominator of the ratio expression.

"High side" applies to the winding associated with the numerator of the ratio expression. The terms "high side" and "low side" are used only where such distinction is significant, but it is noted that the "high side" of the reference transformer may be so connected that the ratio becomes less than unity.

"Burden" refers to any external load on a transformer which causes current other than exciting current in the transformer windings. A voltmeter, another transformer, or any sort of load would be a burden.

"Exciting current" is the total current taken by a transformer when energized with no burden (no load) and comprises two components:

"Magnetizing current" which is in quadrature to the exciting potential, and
"Loss component" which is in phase with the exciting potential.

"Impedance" refers to combined resistance and reactance except when referred to as percent impedance drop which is the voltage, in percent of rated voltage, required to circulate rated full load current in a winding when the other winding is short circuited.

"Power transformer" as used in this specification includes any conventional transformer or autotransformer suitable for transforming power between a source and a utilization apparatus. It may be a substation transformer, distribution transformer, or electric equipment transformer which functions solely as means for change of voltage, but not a special purpose transformer such as those defined below.

"Instrument transformer" includes any transformer functioning as a measuring device, in which special means is usually included to compensate for normal burden.

"Regulating transformer" includes any having special compensating means to provide special regulation characteristics, such as constant voltage transformers, furnace transformers, welding transformers, single turn transformers, and constant current transformers.

"High impedance transformer" includes any in which the arrangement of magnetic circuit, size of conductors, resistance, inductance, or other characteristic is such that the regulation and operation of the transformer is not comparable to conventional power transformers for the purpose of this specification.

The arbitrary distinctions among transformers as defined above are included for the purpose of clarifying the explanations which follow but should not be construed to limit the scope of the invention since, by suitable design, the invention may be applied to special forms of transformers.

Reference is now made to the accompanying drawings, wherein

Fig. 1 is a diagrammatic illustration of a device constructed according to the present invention;

Fig. 2 is a perspective illustration of the preferred physical embodiment of the device;

*General description*

Figure 3:
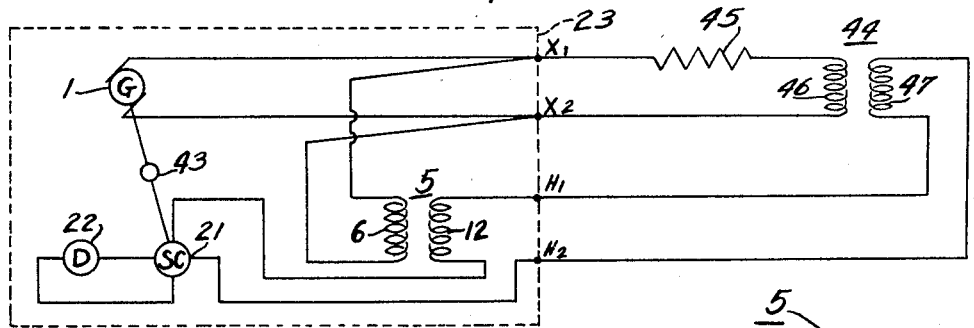
Fig. 3 is a diagrammatic illustration of certain circuit connections employed in the adjustment of the device.

In order to afford a clear understanding of the device provided by the present invention, it will first be described generally with the aid of Figs. 1 and 2, and then its various component parts will be described with particularity in the succeeding sections of this specification.

Referring first to Fig. 1, there is provided a suitable source of alternating current, preferably in the form of a four-pole hand-driven alternator 1 having an operating crank 2. An ammeter 3 and a voltmeter 4 are connected to the alternator. A reference transformer 5 has primary windings 6 and 6a connected to the output leads 7 of the alternator 1 by way of connections 8. The reason for having the primary in two sections will be seen later. The conductors 7 and 8 extend externally of the device to terminal devices 9, by which the primary winding 10 of a transformer 11 to be tested may be connected to the alternator leads 7 in parallel relation with the primary of the reference transformer 5.

The reference transformer 5 is provided with a multi-section secondary winding, comprising sections 12a to 12c, whose effective turns are varied by means of decade switches 13, 14 and 15 associated with the different sections of the secondary winding as hereinafter more fully described. In the illustration of Fig. 1, the decade switches and their connections are shown only symbolically. A voltage divider 16, having an adjustable contact 17, is arranged to have an adjustable portion thereof included in circuit with the said secondary winding and serves to effect fine adjustment of the turn ratio of the reference transformer. The voltage divider 16 is energized from an auxiliary winding 18 on the reference transformer.

By means of leads 19, the secondary winding 20 of the test transformer 11 may be connected in series opposition to the secondary winding 12 through a discriminator device 21 driven by the alternator 1, and through a null detector 22 which preferably is in the form of a galvanometer.

As shown in Fig. 2, the parts of the device are mounted in a box-like casing 23, with the alternator crank 2 extending from one end, and with the meters and control devices mounted on a panel 24. A space is provided adjacent the panel 24 to accommodate the connecting leads. The control knobs for the decade switches and the voltage divider are shown at 25, 26, 27 and 28. Each of these control devices has an indicating dial associated with a small window, the windows being shown at 29, 30, 31 and 32. The four control devices vary the effective turn ratio of the reference transformer, and the dials associated with said devices are calibrated in terms of the turn ratio. Hence the ratio may be read directly through the windows 29 to 32.

In operation of the instrument, the alternator 1 is cranked to apply a voltage to the primary windings of the reference and test transformers. Since the secondaries of the two transformers are in opposition, the null detector indicates conditions of unbalance or balance of the secondary voltages. The synchronous discriminator 21 serves to discriminate against certain undesired voltage components as hereinafter described. The control devices above mentioned are adjusted until the null point is reached. Since the turn ratio of the reference transformer will then correspond to that of the test transformer, the ratio of the latter can be read directly through the windows.

The important features and component parts of the instrument will be described in detail in the subsequent sections.

*Excitation*

It has been common practice in the past to measure ratio by means of voltmeters. At least 10% of normal excitation is commonly used in order to keep error due to voltmeter burden within reasonable limits. Tests made at not less than four different voltages are required by ASA Spec. C57.2—1943 and the voltmeters are required to be interchanged and readings average. In the null method according to my invention, the excitation may be appreciably less than 10% of normal, and averaging of several tests is not necessary.

In the preferred form of my invention, the excitation is supplied from a hand-cranked A. C. generator at or near the normal frequency of the transformer to be tested (usually 60 C. P. S.), and at an open circuit potential corresponding to the rating of the reference transformer (6 to 12 volts, usually 8 volts). The generator impedance is chosen to limit the short circuit current (about 2 amperes). The ratings are not critical except as the elements of the test set are interrelated. They are cited to indicate the low level of power at which tests are made.

The hand-cranked generator is suitable for operation at various frequencies in order to avoid false indications when tests must be made in strong external fields. Moreover, this generator serves as a means of sensitivity control, since it may be operated slowly at first and the speed increased as increased sensitivity is needed. The generator output, therefore, should have reasonably good wave-form at as low as one-tenth of rated speed.

Another inherent advantage of the hand-cranked generator is safety in operation, since the person making the test cannot forget to de-energize the set while he changes connections to the transformer under test.

Obviously the principles of this invention could be applied in an equipment energized from an external power source. Due consideration should be given to insulation and isolation of the equipment from the supply, to sensitivity control, to phase discrimination, and to safe means for disconnecting the equipment from the supply while external connections are made.

Whatever source is used, the instrument should have certain characteristics which are discussed below:

For safety (to personnel) and protection (of equipment to be tested) the supply must be limited to a few watts of available power (about 15 watts is ample).

The frequency should be variable in the power range.

The wave-form is not critical but should be the same at low and high frequencies, and is preferably a sine wave-form.

The power supply should be isolated from ground and insulated from external lines.

Adjustable means to synchronize the discriminator elements with the applied potential must be provided as discussed below.

The potential and frequency should be fairly constant at any level selected by the operator.

The power must be available under conditions which exist in the field or shop where tests are required.

Null balance

Practical transformers connected according to the basic circuit as previously used cannot be balanced to a perfect null because harmonic components and phase differences due to differences in excitation characteristics are superposed on the unbalance current. It is desired to detect the point of balance at which the induced potentials of test and reference transformers are equal. These induced potentials are assumed to be in phase (opposing) with one another and with the applied excitation potential according to theory generally accepted by those skilled in the art. The component of current resulting from a difference between these induced potentials is essentially in phase and becomes zero when the ratios are equal. A further characteristic of this component is reversal of direction when the sense of the potential difference is reversed. Hence, balance between induced potentials can be detected by isolating the component of current which is dependent upon the difference between induced potentials. This is done by means of the discriminator circuit employed, as shown in Fig. 1. A D.-C. galvanometer is used to detect the presence of unbalance current and to indicate the polarity or sense of unbalance. Sensitivity of available D.-C. microammeters is adequate to indicate an unbalance corresponding to the smallest increment which can be observed on the graduated dials of the instrument.

A further requirement of the galvanometer is its ability to endure the currents associated with extreme unbalance, for which purpose aircraft-type instruments are used together with certain characteristics of the hand generator form of excitation.

Obviously the detector may be an electronic tube with associated components or may be an A.-C. galvanometer without departing from the spirit of the invention.

Harmonic and phase discrimination

The galvanometer is inherently insensitive to alternating current of the fundamental and harmonic frequencies and is sensitive to the sense of unbalance.

The synchronous discriminator 21 selects the induced potential component of the potential difference during unbalance. The induced potential component is reversed in alternate half cycles to produce a pulsating unidirectional component while undesired components reversed at the same time are still alternating current and have negligible D.-C. components. The selection of the induced potential component is accomplished by adjusting the phase relation between the discriminator and the exciting potential.

In the preferred embodiment as illustrated in Fig. 1, the discriminator 21 is a synchronous commutator having two mutually insulated segments 33 and 34, and having terminal brushes 35 and 36 engaging the respective segments, and commutating brushes 37 and 38 which alternately engage the interfitting portions 39 and 40 of said segments during successive half cycles of the fundamental frequency of the applied voltage. By this arrangement, the fundamental frequency real component is rectified to pulsating unidirectional current which is supplied to the galvanometer 22. The quadrature component is reversed at its peak and becomes a double frequency alternating current which has an average value of zero and hence does not deflect the galvanometer. Certain harmonic components may be partially rectified by the commutator but the average D.-C. component of the harmonic is less than would be produced in a rectifier.

Slight distortion of wave form occurs at the instant of reversal but the rectification is full-wave in nature so no D.-C. component is introduced in the transformers by the rectifier system.

As indicated above, it is necessary to adjust the phase relation between the discriminator 21 and the alternator 1. This may be accomplished in the manner illustrated in Fig. 3, wherein the elements of the instrument that are essential to the adjustment are shown within the broken line rectangle 23 representing the casing. The adjustment may be made by rotating the brush rigging of the commutator or by rotating the commutator relative to the alternator shaft or both. In Fig. 3, an adjustable coupling is represented at 43 between the alternator and the commutator.

Figure 4:
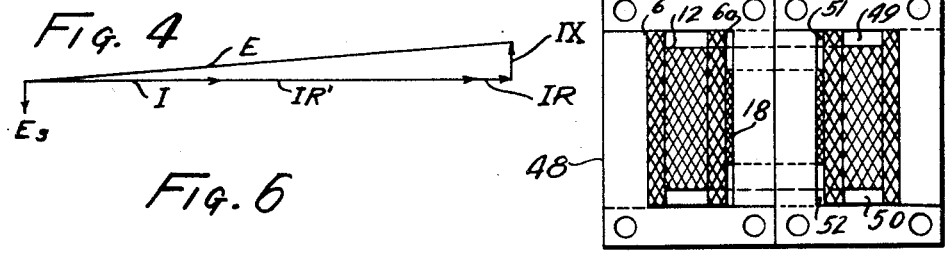
Fig. 4 is a vector diagram which supplements the illustration of Fig. 3.

Preparatory to making the adjustment, a phase shifting network, comprising a mutual inductor 44 and a resistor 45, is connected to the terminals of the instrument as shown. Thus the primary 46 is connected to the alternator 1 through terminals $X_1$ and $X_2$, and secondary 47 is connected to the commutator 21 through terminals $H_1$ and $H_2$. With the decade switches (not shown) adjusted to give zero ratio of transformer 5, the latter is effectively removed from the circuit. The phase shifting network produces a voltage in quadrature to the alternator voltage, and the quadrature voltage is applied to the commutator. The phase relation is adjusted until the detector 22 reads zero. The vector diagram of Fig. 4 indicates the relationship obtained. In this diagram, I is the current on the primary side, IR' is the voltage drop in resistor 45, IR is the in-phase component of voltage across primary 46, IX is the quadrature component of voltage across primary 46, E is the applied voltage, and $E_s$ is the voltage across secondary 47.

While a synchronous commutator has been employed in the illustrated embodiment of my invention, it is not necessary that the discriminator be a commutator. Any switching arrangement which causes the polarity of alternate half cycles to be reversed in synchronism with the supply potential and in a selected definite phase relationship thereto may be used.

Obviously the synchronous commutator could be motor-driven from the same source that supplies the excitation. Such arrangement would be useful in a set which derived its excitation from an external supply, as is possible although not preferred.

A separately excited dynamometer (wattmeter) instrument may be used to accomplish the phase discrimination within the galvanometer. In this modification the dynamometer field coil is excited by the same potential as the transformers and the moving element is connected as the detector. The component of the unbalance current which is in phase with the applied potential then deflects the galvanometer, is sensitive to polarity of unbalance, and accomplishes the phase discrimination without a synchronous switch. The quadrature component and harmonics, being out of phase with the field, do not deflect the dynamometer galvanometer.

It will be apparent that any other suitable means may be employed to discriminate against the quadrature component and harmonics.

*Structure of reference transformer*

Figure 5:
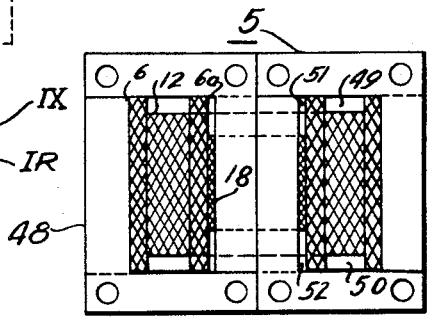
Fig. 5 illustrates the structure of the reference transformer employed in the device.

The reference transformer 5 is preferably of the "shell type," as shown in Fig. 5, the windings 6, 6a, 12 and 18 being wound on the laminated core 48. Since the design of the transformer is important, it will be discussed in some detail.

Power transformers in the range of sizes between 1 and 50,000 kv.a. (which includes almost all transformers used in significant numbers by electric utilities) have no load voltage drops due to exciting current from 0.0010 to 0.0003 times the exciting potential when the excitation is in the order of 10 volts. By designing the reference transformer 5 to have a corresponding voltage drop due to exciting current, 0.0005 times the exciting potential, its characteristic under test conditions is matched closely to that of the transformer under test. In the null-balance method, the voltage drops of the respective transformers tend to cancel leaving only a small differential error due to exciting current. The reference transformer used in my invention, therefore, departs from conventional design and is novel in that the voltage drop due to exciting current in the primary and including the necessary leads for connecting to the transformer under test is designed to be within the limit defined above and at the same time the transformer is to be small and light in weight. This requirement causes the reference transformer to be uneconomical and unconventional according to customary design practice but practical for the purpose of a portable field testing equipment of this sort. In order to accomplish these requirements I have used high permeability alloy in the core laminations, reducing the required ampere-turns excitation; and have used copper of large cross-section in the exciting winding, keeping the total resistance of the winding and associated leads down to a magnitude which, multiplied by the exciting current, yields a voltage drop in the order of 0.0005 times the exciting potential.

A further refinement of core design, however, is desirable in practicing this invention. The induced potential in any turn of the reference transformer must be equal to that in any other turn so that winding increments may be interchangeable under the control of the switching elements. The core laminations are, therefore, arranged with the joints in the laminations fully lapped and symmetrically disposed about the windows. Magnetic gradients are higher at the joints of the core. Hence there is more magnetic leakage around the joints than elsewhere in the core. To prevent this leakage flux from linking with the secondary turns, the primary winding is arranged in two sections, 6 and 6a, as shown in Fig. 5, symmetrically disposed in the window on either side of the centrally located group of secondaries 12, and the primary windings extend across the full height of the window while the secondaries are wound with gaps 49 and 50 between the core and the winding at both top and bottom. In this arrangement the extended ends of the primary windings serve to shield the secondaries from leakage flux caused by magnetic drop at the joints.

The two primary sections are connected in parallel in order to assure that the potential applied to each turn will be equal to that applied to any other turn. This connection is also related to the requirements to be discussed concerning the arrangement of the auxiliary winding 18. Both primary sections should be used and should be connected in parallel for every test, otherwise accuracy may be impaired.

While a "shell-type" transformer is preferably employed, it is apparent that similar magnetic leakage would occur in a "core-type" transformer and would be met by a similar modification of the windings in which the two primary sections could be placed next to the core-legs and extended to the full height of the window and the secondaries could be outside of the primaries and divided between the two coils.

The auxiliary winding 18 energizes the resistance voltage divider 16 arranged to be added to the fixed steps of the secondary and permit balancing ratio to the second and third decimal places. This arrangement is a small burden on the reference transformer and requires precautions in the arrangement to avoid introducing errors. The leakage flux assicated with the auxiliary burden must not thread the secondary windings. Hence the auxiliary winding 18 is disposed between the core and the inner primary section (see Fig. 5) with sufficient end space 51 and 52 to assure that it is shielded by the inner section. In this manner the auxiliary winding is isolated from the secondary and the arrangement is equivalent to a separate auxiliary transformer with the economies and convenience of a single unit.

The total primary copper must be active for every ratio setting. The number of turns in the primary ($N_p$) must be an integral multiple of the smallest secondary section, i. e. for taps at intervals of 0.1 ratio the primary turns $N_p$ must be a multiple of 10. The number of exciting turns may vary, 25, 40, 50, 100 being typical numbers.

The significance of taking taps from the high side instead of the low side is practical rather than theoretical. First—it is convenient to use a fixed number of turns in the exciting winding corresponding to unit ratio (the denominator of the ratio expression) and to select decade multiples for the secondary sections as described below. Second—it is desirable to have a wide range of ratios which could not be obtained with a reasonable number of turns if the taps were taken on the low side.

Furthermore the IR drop in the exciting winding must be small and the exciting ampere-turns must be distributed throughout the length of the magnetic leg. Hence it is desirable to utilize all of the exciting winding in all tests and undesirable to take taps on the exciting side. Since my invention has made it practical to excite on the low side, the advantages of taps taken on the high side may be enjoyed.

The instrument is made direct-reading in ratio expressed decimally which eliminates the need for calculating ratios from test data as has been done previously. In order to be direct-reading it is apparent that the number of active turns in the secondary must be so related to the number of active turns in the primary that in successive positions of the tap-selecting switches the ratios progress decimally. In the preferred arrangement the primary is wound with an arbitrary number of turns ($N_p$), e. g. 50 turns, which is a multiple of 10 and the secondary is made up of sections as follows:

Section 12a = 11 increments of 10 $N_p$ turns each, or 5500 turns

Section 12b = 11 increments of $N_p$ turns each, or 550 turns

Section 12c = 11 increments of 0.1 $N_p$ turns each, or 55 turns

The auxiliary winding 18 preferably has 7 turns, and as will be seen later, these turns are effectively divided into 14 increments of 0.01 $N_p$ turns each.

The decade switches

Figure 6:
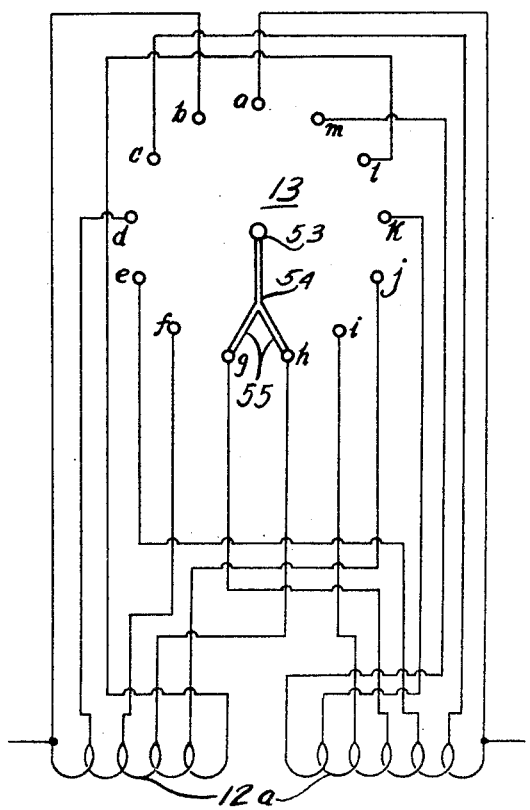
Fig. 6 illustrates one of the decade switches and the associated secondary section.

In Fig. 6 there is illustrated a preferred form of one of the decade switches and its connections to the associated secondary section. Since all of the decade switches and their connections are similar, it is believed to be sufficient to illustrate only one of them. It will be noted that the preferred arrangement employs a "split" secondary section, i. e. the said section is split or divided into two sub-sections. This is also indicated in Fig. 1 wherein it is apparent that each of the three secondary sections is split as mentioned. In the illustration of Fig. 6, the tap-divided portions of the split secondary section represent the increments of the particular section as mentioned above, it being impossible of course, to illustrate the turns of said increments.

The decade switch comprises thirteen stationary contacts which have been designated $a$ to $m$, and a rotatable shaft 53 carrying a resilient contact arm 54 having fingers 55. The arm 54 is movable to twelve indexed positions in which it engages successive pairs of the stationary contacts. Beginning with contact $a$, in the first position the contact arm 54 engages contacts $a$ and $b$. In the next position, it engages contacts $b$ and $c$, and so on to the twelfth position in which it engages contacts $l$ and $m$. It is not intended that the contact arm shall engage contacts $a$ and $m$ simultaneously and provision is made to prevent this.

The connections are such that in the first position in which the contact arm engages contacts $a$ and $b$, the entire secondary section is open-circuited at $l$ and $m$ while continuity to the next decade section is provided through the arm 54. As the arm 54 is moved successively to the other positions, one increment is added alternately from each sub-section. Thus, in the position $b$—$c$, an increment of the right-hand sub-section is included; in the position $c$—$d$, an increment of the left-hand sub-section is also added; in the position $d$—$e$, another increment of the right-hand sub-section is added; and so on. Inactive increments are always open at $l$, $m$ so that they do not impose a burden.

Figure 7:
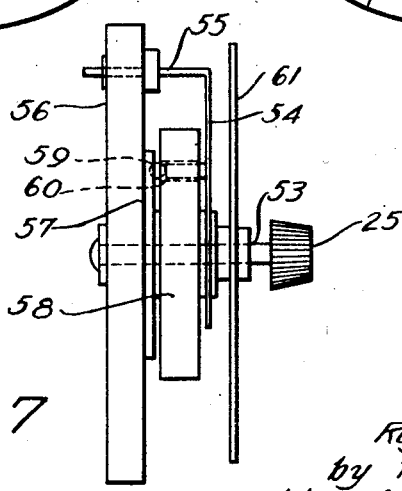
Fig. 7 is a side elevational view of the decade switch of Fig. 6.

While the mechanical structure of the decade switches may take any suitable form, it is preferred to employ a structure substantially as illustrated in Fig. 7. In that figure, 56 is a stationary plate of insulating material carrying the stationary contacts, and also carrying a stationary indexing plate 57 having spaced apertures or recesses. An arm 58 on shaft 53 loosely carries a ball 59 which is adapted to seat in said recesses. A plunger 60 is engaged by the ball when the latter is not seated in a recess, and at such time the resilient contact arm 54 is held away from the plane of the stationary contacts. But when the ball 59 is seated in a recess, the arm 54 is permitted to engage the stationary contacts. It will now be seen that by proper location of the recesses, the contact arm 54 is only permitted to engage the contacts as above described, and said arm is prevented from engaging contacts $a$ and $m$ simultaneously. The dial 61 on the shaft 53 is calibrated in terms of turn ratio.

Figure 9:
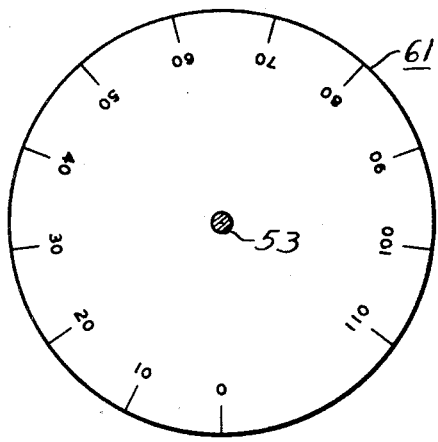
Figs. 9 to 12 are face views of the various dials of the decade switches and the voltage divider.
Figure 10:
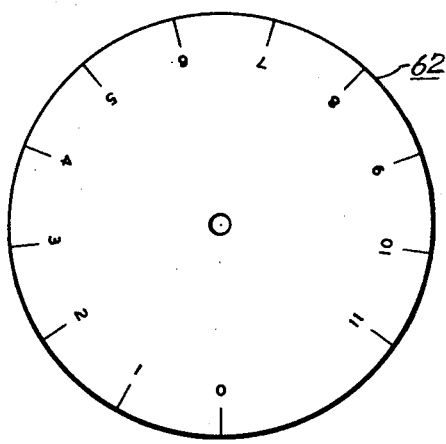
Figure 11:
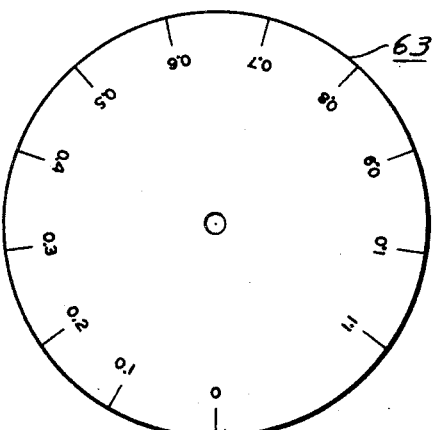

The indicator dials of the three decade switches are shown in Figs. 9 to 11 respectively. The dial 61 of the first decade switch 13 has markings thereon from 0 to 110 in increments of 10. The dial 62 of the second decade switch 14 has markings from 0 to 11 in increments of 1. The dial 63 of the third decade switch 15 has markings from 0 to 1.1 in increments of 0.1.

The voltage divider

Figure 8:
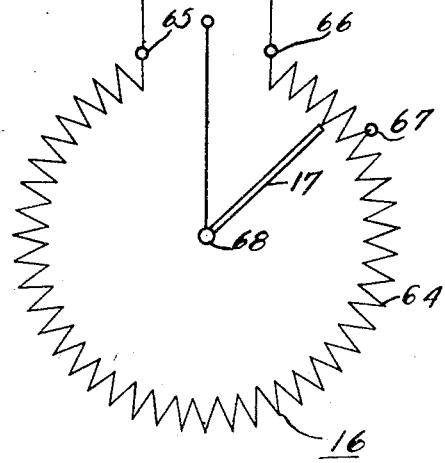
Fig. 8 illustrates the adjustable voltage divider employed in the device.

As indicated previously, the purpose of the voltage divider 16 and its energizing winding 18 is to obtain a finer adjustment of the turn ratio of the reference transformer than would be possible by the use of the multi-section secondary and the decade switches alone. As shown in Fig. 8, the voltage divider comprises a resistance element 64 having end terminals 65 and 66 and an intermediate terminal 67. The adjustable contact arm 17 is carried by the rotatable shaft 68 so as to be movable over the entire resistance element between the end terminals. The arm is continuously movable, there being no indexed positions. As indicated in Fig. 1, the ends of the resistance element are connected to the energizing winding 18 and the intermediate terminal 67 is connected to the last secondary section. The intermediate fixed tap constitutes a zero reference, and by moving the movable arm 17 relative thereto, various increments of the potential across winding 18 may be effectively added to or subtracted from the potential across the multi-section secondary.

Figure 12:
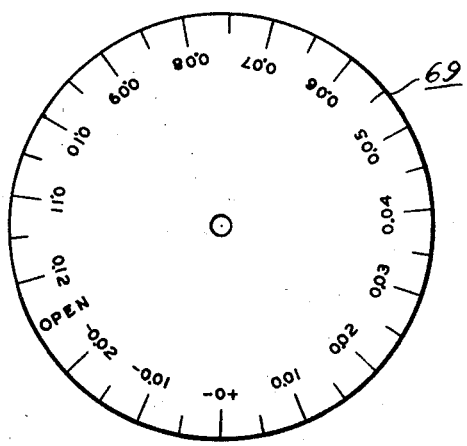

Fig. 12 shows the dial 69 of the voltage divider, which dial is carried by the shaft 68. The dial has a zero point corresponding to the intermediate tap 67. Thus when the contact arm 17 is at tap 67, the dial reading is zero. On one side of the zero point of the dial are minus markings .01 and .02. This "negative" portion of the dial corresponds to the portion of the voltage divider resistance between terminals 66 and 67. On the opposite side of the zero point of the dial are plus markings from 0 to 12 in increments of .01. This "positive" portion of the dial corresponds to the portion of the divider resistance between terminals 65 and 67. Each increment of the dial has a line midway between the marked lines.

As indicated above, the smallest incremental variation effected by the smallest secondary section and its associated decade switch is 0.1. By means of the voltage divider and its energizing winding, the incremental variations may be carried down to 0.005 as represented by the line markings on dial 69, and it is possible to interpolate down to 0.001. A hairline on the window associated with the dial enables such interpolation. In a particular physical embodiment of the apparatus, the overall range of variation of the effective turn ratio of the reference transformer extended from 0.001 to 122.22. Thus, the arrangement provided by the invention makes it possible to adjust the effective turn ratio of the reference transformer over a wide range.

From the foregoing description, it will be seen that the invention provides a novel device having numerous advantages. It will be understood, of course, that the invention is not limited to the specific form illustrated but is capable of various modifications.

I claim:

1. A device for measuring turn ratio of test transformers which may be widely diversified as to size, voltage, frequency and ratio, said device comprising a source of low exciting potential, a reference transformer characterized in that its primary is matched as to excitation characteristics with the average of the excitation characteristics possessed by the test transformers at the exciting potential, means for connecting the primaries of said reference transformer and a selected test transformer to said source, means for connecting the secondary of the selected test transformer in series opposition to the secondary of said reference transformer, null detector means in circuit with said secondaries, means for discriminating against undesired voltage components appearing in the secondary circuit, means for effecting relatively coarse adjustment of the effective turn ratio of said reference transformer, an auxiliary winding on said reference transformer inductively coupled to the primary thereof, a voltage divider connected to said auxiliary winding so that a voltage is established across the divider, fixed and adjustable voltage-dividing connections on said divider serially included in the secondary circuit for including a variable portion of the voltage divider serially in the secondary circuit so that voltage increments may be included in or removed from the secondary circuit, whereby to effect fine adjustment of the effective turn ratio of said reference transformer, and means for indicating the effective turn ratio of said reference transformer.

2. A device according to claim 1, wherein at least part of the primary of said reference transformer is physically interposed between said auxiliary winding and the secondary of said reference transformer, whereby said auxiliary winding and said secondary are shielded from one another.

3. A device according to claim 1, wherein said source of exciting potential is a hand-operated generator.

4. A device according to claim 1, wherein said source of exciting potential is a hand-operated generator having a rotatable shaft, and said discriminating means comprises a rotary rectifier driven by said generator shaft.

5. A device according to claim 1, wherein the secondary of said reference transformer comprises tapped sections, and said coarse adjustment means comprises selector switches connected to said sections to vary the number of effective turns of said secondary.

ROYCE L. MURRAY.

REFERENCES CITED

The following references are of record in the file of this patent:

UNITED STATES PATENTS

| Number | Name | Date |
|---|---|---|
| 734,438 | Skinner | July 21, 1903 |
| 1,588,539 | Fortescue | June 15, 1926 |
| 2,046,436 | Wascheck | July 7, 1936 |
| 2,114,143 | Hunter | Apr. 12, 1938 |
| 2,410,386 | Miller | Oct. 29, 1946 |
| 2,432,948 | Thompson | Dec. 16, 1947 |
| 2,434,547 | Browne | Jan. 13, 1948 |

OTHER REFERENCES

Publication titled "Testing Current Transformers" by Stubbins in "The Electrical Review," April 7, 1933, pages 480 and 481.

Certificate of Correction

Patent No. 2,527,568

October 31, 1950

ROYCE L. MURRAY

It is hereby certified that error appears in the printed specification of the above numbered patent requiring correction as follows:

Column 7, line 73, for "kv.a." read *kva*; column 9, line 8, for "assicated" read *associated*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*